United States Patent Office 2,719,136
Patented Sept. 27, 1955

2,719,136

COMPOSITIONS FROM POLYMERIZING ACRYLONITRILE IN THE PRESENCE OF MALEIC ANHYDRIDE COPOLYMERS

John R. Caldwell, Kingsport, Tenn., assignor to Eastman Kodak Company, Rochester, N. Y., a corporation of New Jersey No Drawing. Application November 29, 1951, Serial No. 259,011

8 Claims. (Cl. 260—45.5)

This invention relates to composite, resinous compositions comprising a major proportion of acrylonitrile and a minor proportion of a nonpolymerizable copolymer (heteropolymer) of maleic anhydride and an ethenoid monomer selected from the group consisting of isopropenyl acetate and styrene.

Acrylonitrile has previously been used in the preparation of various polymers which are characterized by insolubility or very low solubility in many of the usual organic solvents. Many of these polymers, especially those containing a high percentage of acrylonitrile are further characterized by their poor affinity for organic dyes, it being well known that fibers spun from polyacrylonitrile solutions can be passed through dye baths without material amounts of the dye adhering to the fiber.

Attempts have been made to improve the physical properties and to increase the dyeability of acrylonitrile fibers by interpolymerizing acrylonitrile with certain monomers whose polymers have good affinity for organic dyes. While this procedure does give polymeric products from which fibers having such improved properties can be obtained, a serious drawback arises in certain instances due to a substantial lowering of the softening point of the fiber. For example, a ternary interpolymer made from about 60 parts by weight of styrene, about 20 parts by weight of maleic anhydride and 20 parts by weight of acrylonitrile, shows good solubility and excellent molding properties, but has a softening point of about 145° C. which is too low for practical purposes of fiber production therefrom. Mixing the above kind of ternary interpolymers with polyacrylonitrile by means of a common solvent for fiber improvement purposes have not proven successful because the solutions tend to separate into two phases and form cloudy, nonhomogeneous systems, and fibers produced from these solutions show segmentation into their individual components along their horizontal axis. Furthermore, the fibers from such nonhomogeneous solutions are also too low in softening points for practical value. This result is not surpising in view of the generally known incompatibility of polyacrylonitrile with many other resinous organic substances.

Whereas the simple ternary interpolymers mentioned above wherein styrene is the major component soften at too low temperatures to be of use in the preparation of fibers without further special conditioning steps and mixtures of these ternary interpolymers with polyacrylonitrile give only heterogeneous solutions which separate into layers on standing and from which fibers showing segmentation are obtained, I have found that certain composite, resinous compositions comprising a major proportion of acrylonitrile and a nonpolymerizable material such as an approximately 1:1 resinous copolymer of maleic anhydride and isopropenyl acetate or styrene give stable solutions which do not separate into distinct phases or layers on standing, and from which solutions fibers having improved characteristics such as melting points above 240° C., ready susceptibility to dyeing and homogeneous structural distribution, can be spun. They are also highly compatible with polyacrylonitrile to give homogeneous solutions in common solvents from which fibers of good quality, but of somewhat lower softening point than 240° C. can be prepared.

It is, accordingly, an object of my invention to provide composite, resinous compositions comprising a major proportion of acrylonitrile and a minor proportion of a copolymer of maleic anhydride and isopropenyl acetate or styrene. Another object of my invention is to provide methods for making these compositions. Still another object of my invention is to provide homogeneous solutions of these composite, resinous compositions, and fibers prepared from these solutions. Other objects will become apparent from a consideration of the following description and examples.

According to the invention, I prepare my new compositions by polymerizing a mixture comprising from 55 to 85 per cent by weight of acrylonitrile and from 45 to 15 per cent by weight of a nonpolymerizable, substantially 1:1 copolymer of maleic anhydride and either isopropenyl acetate or styrene. Amounts less than 15 per cent of the nonpolymerizable copolymer do not impart sufficient dye susceptibility, while amounts in excess of 40 per cent produce polymer products whose fibers have too low a softening temperature to be of practical utility. The products of my invention contain approximately the same proportion of components as the starting polymerization mixtures.

The polymerization reactions for preparing the new compositions of the invention are promoted by heating the reaction mixtures at temperatures of from 40° to 80° C., although higher or lower temperatures can also be used, in the presence of at least one peroxide polymerization catalyst and at normal or above normal atmospheric pressures. Suitable catalysts include the organic and inorganic peroxide polymerization catalysts such as hydrogen peroxide, persulfates (e. g., alkali metal persulfates such as sodium persulfate, potassium persulfate, etc. and ammonium persulfate), perborates (e. g. alkali metal perborates such as sodium perborate, potassium perborate, etc., and ammonium perborate), percarbonates (e. g. the alkali metal percarbonates such as sodium percarbonate, potassium percarbonate etc.), benzoyl peroxide, acetyl peroxide, urea peroxide, lauroyl peroxide, and the like. An activating agent such as sodium bisulfite can be used, if desired, in conjunction with the polymerization catalysts. A chain length regulator such as dodecyl mercaptan can also be used with advantage. The quantity of catalyst employed can be varied widely, but preferably about from 0.05 to 3 percent, based on the weight of acrylonitrile monomer is efficacious.

Advantageously, the polymerizations can be carried out in mass, but preferably in aqueous dispersions employing, if desired, a relatively small amount of an emulsifying agent such as alkali metal salts of fatty alcohol sulfates (e. g., sodium lauryl sulfate, etc.), alkali metal salts of aromatic sulfonic acids (e. g., sodium isobutyl naphthalene sulfonate, etc.), salts of higher fatty acids (e. g., sodium or potassium stearate, palmitate, etc.), ordinary soaps, higher molecular weight quaternary ammonium salts (e. g. dimethylbenzylphenyl ammonium chloride, etc.). The emulsifying agent is employed in an amount not exceeding about 0.5%, based on the weight of aqueous medium. The polymerizations can also be carried out in the presence of organic solvents such as acetone, acetic acid, the lower alcohols such as methanol or ethanol, and aqueous mixtures of these solvents. When such organic solvents are employed in admixture with one another, with or without water, it is preferable to use catalysts such as benzoyl peroxide, acetyl peroxide, cumene hydroperoxide, and the like.

The following examples will serve to illustrate more fully the manner whereby I practice my invention.

*Example 1*

100 g. of isopropenyl acetate, 100 g. of maleic anhydride and 3 g. of benzoyl peroxide were dissolved in 500 cc. of benzene and the solution heated at 50° to 60° C. for a period of 30 hours. The maleic anhydride/isopropenyl acetate interpolymer was filtered off and dried. Analysis indicated that it was substantially a 1:1 heteropolymer of maleic anhydride and isopropenyl acetate.

Then 150 g. of acrylonitrile, 100 g. of the above prepared maleic anhydride/isopropenyl acetate resin and 2 g. of potassium persulfate were dissolved in a mixture of 600 cc. of acetone and 100 cc. of water. The solution was allowed to stand at 50° C. for a period of 24 hours. The resin which precipitated was filtered off and washed with water and dried. This product contained approximately 40 per cent by weight of the maleic anhydride interpolymer. It dissolved readily in dimethyl acetamide, dimethyl formamide and similar solvents to give clear, smooth dopes that showed no tendency to separate on standing for a week or longer. The dope can be dry spun by extrusion through a multi-hole spinneret into a heated atmosphere to give yarn having good affinity for vat, direct cotton, basic and cellulose acetate dyes and a softening point above 240° C.

*Example 2*

One mole each of maleic anhydride and styrene were dissolved in three times their weight of benzene and 2 per cent of benzoyl peroxide, based on the total weight of monomers, was added. The solution was heated in a 50° C. water bath for 24 hours. The resin which precipitated was filtered off, washed with benzene and dried in air.

Then 200 g. of acrylonitrile, 50 g. of the maleic anhydride/styrene interpolymer prepared as above, 800 cc. of water, 2 g. of potassium persulfate and 1 g. of dodecyl mercaptan were placed in a flask and the mixture stirred at 50° to 55° C. for a period of 8 hours. The resinous product which separated out of solution as a grainy precipitate was filtered out, washed and dried. The yield was approximately 240 grams. The resinous product readily dissolved in dimethyl formamide to give a clear smooth dope that showed no tendency to separate into separate phases or layers even on standing for over a week. The dope was spinnable by extrusion through a multi-hole spinneret into a heated atmosphere to give yarn which dyes well with vat dyes, cellulose acetate dyes and direct cotton dyes and had a softening point above 240° C.

*Example 3*

100 g. of acrylonitrile, 50 g. of the maleic anhydride/styrene interpolymer prepared as described in Example 2, 600 g. of water, 1 g. of potassium persulfate, 0.6 g. of dodecyl mercaptan and 2 g. of sodium octadecyl sulfate were placed in a flask and the mixture stirred at 55° to 60° C. for 6 hours. The precipitated resinous product was filtered out, washed with water and dried. The yield of product was approximately 140 g. It consisted of approximately 33 per cent by weight of the maleic anhydride interpolymer and 67 per cent by weight of acrylonitrile, was soluble in dimethyl formamide and fibers produced therefrom had a softening point above 240° C.

*Example 4*

One part by weight of the acrylonitrile-maleic anhydride/isopropenyl acetate resinous product prepared by the process of Example 1 and one part by weight of polyacrylonitrile were dissolved in 8 parts by weight of dimethyl formamide to give a smooth clear spinning dope. The dope was extruded through a multi-hole spinneret into a coagulating bath consisting approximately of 60 parts water and 40 parts dimethyl formamide. The filaments obtained were washed with water, dried, and drafted 600 per cent in a steam chamber maintained at 170° to 180° C. Yarn testing 3.6 grams per denier and 16 per cent elongation was obtained. This yarn contained approximately 20 percent by weight of the maleic anhydride/isopropenyl acetate interpolymer. It dyed deeply with cellulose acetate dyes, direct cotton dyes, vat dyes and basic dyes.

*Example 5*

One part by weight of the resinous product prepared as described in Example 3 and one part of polyacrylonitrile were dissolved in 10 parts by weight of dimethyl acetamide to give a clear, smooth solution. Fibers spun from the solution showed good dyeings with vat dyes, cellulose acetate dyes and direct cotton dyes and were entirely free from segmentation defects.

By proceeding as set forth in the preceding Examples 1 to 3, other similarly useful polymer compositions can be prepared employing polymerization mixtures containing 55, 70, 75, 85, etc. per cent by weight of acrylonitrile, the remainder of the reactants being in each case a nonpolymerizable resinous material selected from an approximately 1:1 copolymer of maleic anhydride and isopropenyl acetate or styrene. By proceeding as set forth in the preceding Examples 4 and 5, other homogeneous mixed compositions and fibers can be prepared containing from 1 to 2 parts by weight of one or more of the resinous compositions of the invention illustrated by Examples 1 to 3 and from 2 to 1 parts by weight of polyacrylonitrile.

The new compositions prepared as described in the preceding examples are all soluble in one or more solvents such as dimethyl formamide, dimethyl acetamide, gamma-butyrolactone, ethylene carbonate, valerolactone, ethylene cyanohydrin and tetramethylene cyclic sulfone. As indicated in the examples, the new compositions dissolved in these solvents can be spun to yarn by the usual wet spinning methods wherein a dope is extruded through a multi-hole spinneret into a precipitating bath consisting of an organic liquid or an aqueous emulsion. Alternatively, fibers can be spun from these solutions by the dry spinning or evaporative method wherein the solution is extruded through a similar multi-hole spinneret but into a heated atmosphere. The solutions of my new compositions can also be coated on a film-forming surface of metal or glass, for example, the solvent evaporated off or extracted from the coating with a nonsolvent and the resulting film stripped from the film-forming surface. Plasticisers, fillers, coloring matter, etc., can be added to the above solutions.

What I claim is:

1. A process for preparing a composite polymer of acrylonitrile and a maleic anhydride copolymer comprising heating in the presence of a peroxide polymerization catalyst a mixture comprising from 55 to 85 percent by weight of acrylonitrile as the sole polymerizable monomer and from 45 to 15 per cent by weight of an approximately 1:1 copolymer of maleic anhydride and an unsaturated compound selected from the group consisting of isopropenyl acetate and styrene.

2. A process for preparing a composite polymer of acrylonitrile and a maleic anhydride copolymer comprising heating in the presence of a peroxide polymerization catalyst a mixture comprising from 55 to 85 percent by weight of acrylonitrile as the sole polymerizable monomer and from 45 to 15 per cent by weight of an approximately 1:1 copolymer of maleic anhydride and isopropenyl acetate.

3. A process for preparing a composite polymer of acrylonitrile and a maleic anhydride copolymer comprising heating in the presence of a peroxide polymerization catalyst a mixture comprising from 55 to 85 per cent by weight of acrylonitrile as the sole polymerizable monomer and from 45 to 15 per cent by weight of an approximately 1:1 copolymer of maleic anhydride and styrene.

4. A process for preparing a composite polymer of acrylonitrile and a maleic anhydride copolymer comprising heating in the presence of a persulfate polymerization catalyst a mixture comprising from 55 to 85 percent of acrylontrile as the sole polymerizable monomer and from 45 to 15 per cent by weight of an approximately 1:1 copolymer of maleic anhydride and isopropenyl acetate.

5. A process for preparing a composite polymer of acrylonitrile and a maleic anhydride copolymer comprising heating in the presence of a persulfate polymerization catalyst a mixture comprising from 55 to 85 per cent by weight of acrylonitrile as the sole polymerizable monomer and from 45 to 15 per cent by weight of an approximately 1:1 copolymer of maleic anhydride and styrene.

6. The polymer compositions obtained according to claim 1.

7. The polymer compositions obtained according to claim 2.

8. The polymer compositions obtained according to claim 3.

References Cited in the file of this patent

UNITED STATES PATENTS

| | | |
|---|---|---|
| 2,047,398 | Voss et al. | July 14, 1936 |
| 2,511,811 | Baer | June 13, 1950 |
| 2,575,006 | Coover et al. | Nov. 13, 1951 |

FOREIGN PATENTS

| | | |
|---|---|---|
| 999,594 | France | Oct. 3, 1951 |